United States Patent Office 2,878,866
Patented Mar. 24, 1959

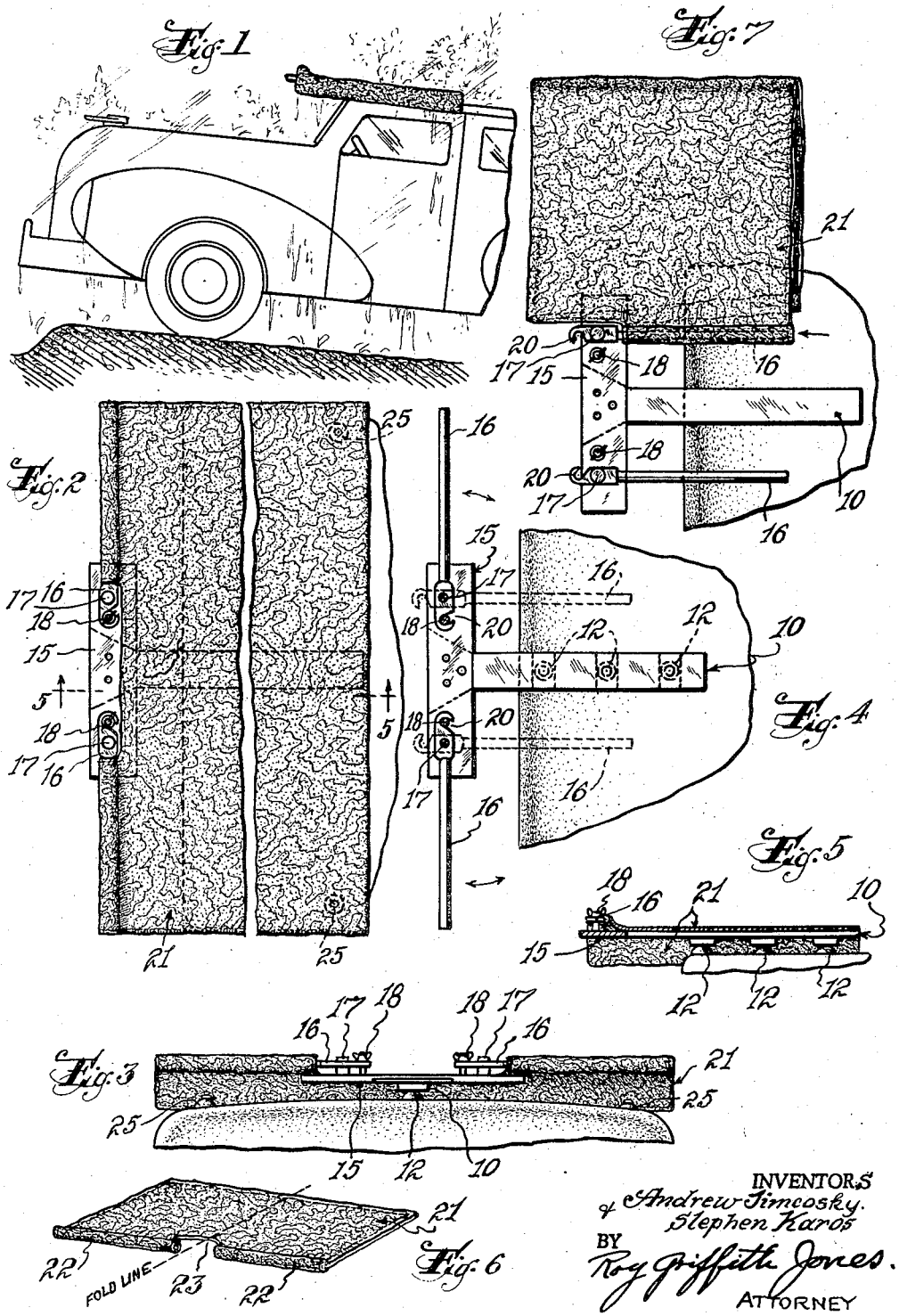

2,878,866

RAIN SHIELD FOR AUTOMOBILES

Andrew Jimcosky, Newark, and Stephen Karos, Irvington, N.J.

Application September 13, 1957, Serial No. 683,800

1 Claim. (Cl. 160—368)

This invention relates to rain shields for automobiles, to prevent the windshield from becoming rain-covered and thus obscuring vision.

The invention provides a device, of the character mentioned, which is simple in construction, easily attached to, and detached from, an automobile; which may be quickly folded and unfolded; and which may be carried in the trunk of the car when not in use. And while the structure herein shown and described is particularly desirable in open-air motion picture theatres, where cars are usually parked on an incline, in which position the windshield is the more exposed to the rain, the device is useful whenever rain falls, and especially if the usual type of wiper is out of order.

The drawings illustrate one form of the invention, and in these:

Fig. 1 is a partial side view of a car with a rain shield of this invention;

Fig. 2 is a plan view of the device;

Fig. 3 is a front elevation showing the device on a car;

Fig. 4 is a plan view of the frame, showing in dotted lines the collapsed position of the arms;

Fig. 5 is a section on line 5—5 of Fig. 2; and

Fig. 6 is a perspective of the sheet which is secured to the frame.

Fig. 7 is a plan view of the device, with pivoted arms thereof, in position for the placement of a rain-proof sheet thereon.

Referring to the drawings for a more detailed description thereof, the device comprises a strip 10. This strip is provided with suction cups 12 to removably secure it on top of a car, running from the front toward the rear and in the middle. To form a flat T-shaped member, the strip 10 is secured at its forward end to a crosspiece 15, to which crosspiece extension arms 16 are pivotally secured at 17 so that they may be either aligned with crosspiece 15 or turned back parallel to strip 10 when the device is to be collapsed, as shown in Fig. 4, for the purpose of storing the device, as in the trunk of the car. Wing bolts 18 are provided adjacent the inner ends of the arms 16 for the purpose of tightening the arms in a desired position, slots 20 in the arms being formed to allow movement of the arms relative to the wing bolts.

On the described frame is a flexible, rain-proof sheet 21, shown in perspective in Fig. 6. This sheet is looped along the front edge and sewed to form sleeves 22, separated by a cut-out 23. The sleeves fit over the extension arms 16 when the latter are turned back, as shown in Fig. 4, the sheet being folded along the indicated fold line. The arms are then brought forward into alignment with the crosspiece 15. The sheet may be held to the top of the car as by suction cups 25, shown at the rear corners of the sheet, or in any other suitable manner, as by spring clamps to the car gutters.

What is claimed is:

The combination, with an automobile, of a rain shield on the front portion of the roof thereof and extending in front of the windshield when the automobile is headed up a slope, the rain shield consisting essentially of a flat T-shaped member, the stem of the T disposed lengthwise of the roof and in the middle thereof and extending in front of the windshield, the crosspiece of the T also being in front of the windshield, a pair of bars pivoted to the crosspiece of the T, one adjacent each end thereof, and adapted to be moved backwardly from a position in line with the crosspiece to spaced parallel positions at right angles thereto, a flexible and foldable cover on said frame and having spaced hems at the front edge enclosing said bars and adapted to be placed over the bars when the latter are in the aforesaid parallel position, a locking pin on the crosspiece for each bar, each of the bars having a recess adapted to lock with one of said pins to hold the bars in alignment with the crosspiece, and means adjacent the rear corners of the cover detachably connecting it to the roof.

References Cited in the file of this patent

UNITED STATES PATENTS

| | | |
|---|---|---|
| 823,096 | Armstrong | June 12, 1906 |
| 2,231,293 | Norman | Feb. 11, 1941 |
| 2,736,375 | Rupert | Feb. 28, 1956 |
| 2,778,676 | Francis | Jan. 22, 1957 |